(12) United States Patent
Mukhtar et al.

(10) Patent No.: US 10,363,886 B2
(45) Date of Patent: *Jul. 30, 2019

(54) THICK MOLDED TAPE PAD

(71) Applicant: ABC Group Inc., Toronto, ON (CA)

(72) Inventors: Michael Mukhtar, Farmington Hills, MI (US); Dave Flajnik, Rochester Hills, MI (US); David Patrick Boucard, Royal Oak, MI (US)

(73) Assignee: ABC TECHNOLOGIES INC., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,190

(22) Filed: Jan. 8, 2018

(65) Prior Publication Data

US 2018/0251082 A1 Sep. 6, 2018

Related U.S. Application Data

(63) Continuation of application No. 15/307,281, filed as application No. PCT/US2015/028245 on Apr. 29, 2015, now Pat. No. 9,862,334.

(60) Provisional application No. 61/986,588, filed on Apr. 30, 2014.

(51) Int. Cl.
| | |
|---|---|
| *B60R 13/04* | (2006.01) |
| *B60J 5/04* | (2006.01) |
| *B62D 25/18* | (2006.01) |
| *B62D 29/04* | (2006.01) |

(52) U.S. Cl.
CPC ............ *B60R 13/04* (2013.01); *B60J 5/0468* (2013.01); *B62D 25/18* (2013.01); *B62D 29/04* (2013.01)

(58) Field of Classification Search
CPC ........ B60R 13/04; B62D 25/18; B62D 29/04; B60J 5/0468
USPC ................................ 293/128; 296/198, 1.08
See application file for complete search history.

(56) References Cited

U.S. PATENT DOCUMENTS

| | | | | |
|---|---|---|---|---|
| 5,340,154 A | * | 8/1994 | Scott | ...................... B62D 25/18 280/154 |
| 5,531,500 A | * | 7/1996 | Podvin | .................. F41H 5/0478 109/49.5 |
| 5,879,045 A | | 3/1999 | Logan | |
| 6,171,543 B1 | | 1/2001 | Hirose | |
| 6,205,624 B1 | | 3/2001 | Mockridge | |

(Continued)

OTHER PUBLICATIONS

International Search Report and Written Opinion dated Aug. 5, 2015 in PCT/US2015/028245.

*Primary Examiner* — Joseph D. Pape
(74) *Attorney, Agent, or Firm* — Medler Ferro Woodhouse & Mills PLLC

(57) ABSTRACT

An exterior component is disclosed for attachment to a vehicle surface of an external vehicle structure. The exterior component comprises a primary body having a pad support wall and a profile wall extending therefrom, the profile wall defining an exterior profile of the exterior component, and presenting an exterior surface having a desired aesthetic finish. The pad support wall is an elongate continuous structure that runs substantially the entire length of the exterior component. The pad support wall presents a continuous tape pad configured to receive a suitable adhesive for bonding the exterior component to a receiving vehicle surface. The exterior component is exemplified in the form of a door cladding, and a wheel-flare molding.

17 Claims, 4 Drawing Sheets

(56) References Cited

U.S. PATENT DOCUMENTS

| | | |
|---|---|---|
| 6,205,642 B1 | 3/2001 | Czirmer |
| 7,523,982 B2 * | 4/2009 | Yamaguchi ............. B60R 13/04 296/209 |
| 7,846,533 B2 | 12/2010 | Zawacki et al. |
| 2007/0085361 A1 | 4/2007 | Hauser |
| 2013/0009425 A1 | 1/2013 | Flajnik et al. |

* cited by examiner

THICK MOLDED TAPE PAD

FIELD OF THE INVENTION

The present invention relates to the field of automotive exterior components, and in particular to molded components incorporating a thick tape pad to facilitate attachment.

BACKGROUND OF THE INVENTION

In automotive manufacturing, many of the exterior components such as door cladding and wheel-flares are separately formed structures, generally of multi-piece construction, and made of thermoplastic materials that are attached to the vehicle using a combination of adhesives and mechanical fixtures. The adhesives are generally applied to ribs that are molded intermittently along the length of the component. If not molded correctly, sink marks on the Class A surface are a possibility, decreasing the aesthetic qualities of the component. It has also been found that the ribs provide a very limited surface area for adhesion, increasing the likelihood of component detachment during vehicle use.

SUMMARY OF THE INVENTION

According to an embodiment, provided is an exterior component for attachment to a vehicle surface of a vehicle external structure. The exterior component comprises a primary body having a pad support wall and a profile wall extending therefrom. The profile wall defines an exterior profile of the exterior component, and presents an exterior surface having a desired aesthetic finish. The pad support wall is an elongate continuous structure that runs substantially the entire length of the exterior component, the pad support wall presenting a continuous tape pad configured to receive a suitable adhesive for bonding the exterior component to the vehicle surface.

According to another embodiment, provided is an automotive door cladding for attachment to a vehicle surface of a vehicle external structure. The door cladding comprises a primary body having a pad support wall and a profile wall extending therefrom. The profile wall defines an exterior profile of the door cladding, and presents an exterior surface having a desired aesthetic finish. The pad support wall is an elongate continuous structure that runs substantially the entire length of the door cladding. The pad support wall presents a continuous tape pad configured to receive a suitable adhesive for bonding the door cladding to the vehicle surface.

According to a further an embodiment, provided is an automotive wheel-flare molding for attachment to a vehicle surface of a vehicle external structure. The wheel-flare molding comprises a primary body having a pad support wall and a profile wall extending therefrom. The profile wall defines an exterior profile of the wheel-flare molding, and presents an exterior surface having a desired aesthetic finish. The pad support wall is an elongate continuous structure that runs substantially an entire length of the wheel-flare molding. The pad support wall presents a continuous tape pad configured to receive a suitable adhesive for bonding the wheel-flare molding to the vehicle surface.

BRIEF DESCRIPTION OF THE DRAWINGS

The foregoing and other features and advantages of the invention will be apparent from the following description of the invention as illustrated in the accompanying drawings.

The accompanying drawings, which are incorporated herein and form a part of the specification, further serve to explain the principles of the invention and to enable a person skilled in the pertinent art to make and use the invention. The drawings are not to scale.

FIG. 2a is a sectional view of the exterior component of FIG. 1 taken along line 2a-2a.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive exterior components, the invention may also be applied to other automotive and non-automotive applications. Furthermore, there is no intention to be bound by any expressed or implied theory presented in the preceding technical field, background, brief summary or the following detailed description.

Figure 1:
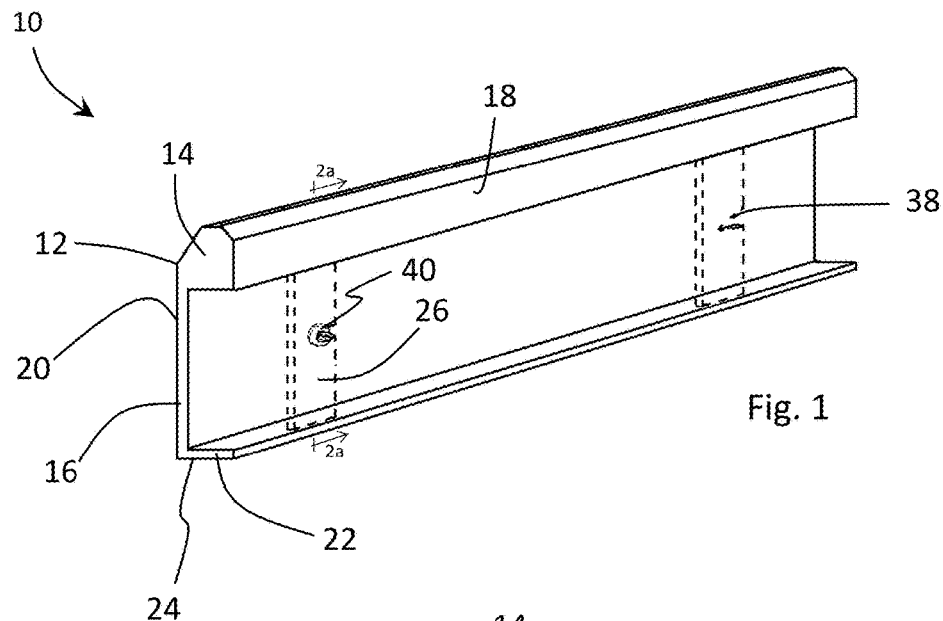
FIG. 1 is a perspective view of an automotive exterior component in accordance with an embodiment hereof.
Figure 2A:
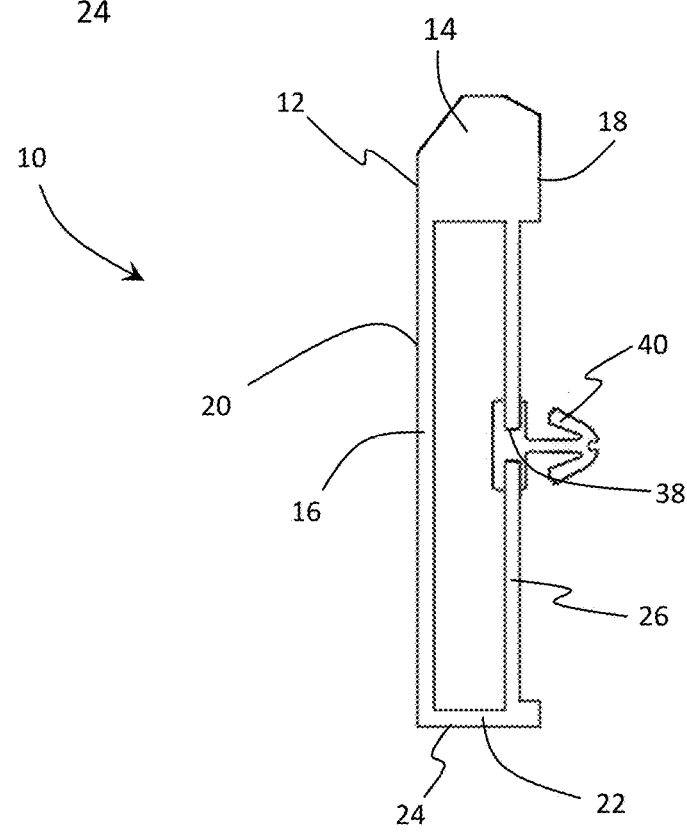

Turning now to FIGS. 1 and 2a, shown is an exterior component 10 for attachment to a vehicle surface of a vehicle external structure that incorporates a tape pad according to an embodiment of the invention. Exterior component 10 generally provides a primary body 12 having a pad support wall 14 and a profile wall 16 extending therefrom. Pad support wall 14 is generally provided as a thick-walled structure that runs substantially the entire length of exterior component 10. Pad support wall 14 presents a continuous tape pad 18, configured to receive a suitable adhesive (i.e. adhesive tape) for bonding exterior component 10 to the vehicle surface of the vehicle external structure (e.g. a door skin). Profile wall 16 defines an exterior profile of the exterior component, and presents an exterior surface 20 having the desired aesthetic finish, for example a Class A surface as defined in the automotive arts. As shown in FIGS. 1 and 2a, primary body 12 of exterior component 10 also includes a lower wall 22 having an exterior surface 24 that faces in a generally downward orientation.

Exterior component 10 may present one or more clip mounts 26 along its length on the side configured for attachment to the vehicle. Each clip mount 26 (shown as dash lines in FIG. 1) is defined by a wall structure that extends from pad support wall 14 to lower wall 22 as shown. As will be appreciated, the number of clip mounts implemented in a particular exterior component will range from zero to a plurality of clip mounts, depending on the component in question and the intended mounting environment.

As shown, each clip mount 26 provides at least one slot or suitable opening 38 for use with an automotive clip 40, the features and operations of which are generally known in the art. Automotive slip 40 cooperates with a respective hole on the vehicle (e.g. door skin; not shown), ensuring attachment therebetween.

In use, exterior component 10 is affixed to the vehicle using adhesive bonding placed upon continuous tape pad 18, as well as mechanical attachment way of automotive clips (when provided). In this way, the extent of adhesive bonding between exterior component 10 and the vehicle is considerably increased relative to prior art arrangements incorporating intermittent thin tape ribs.

Figure 2B:
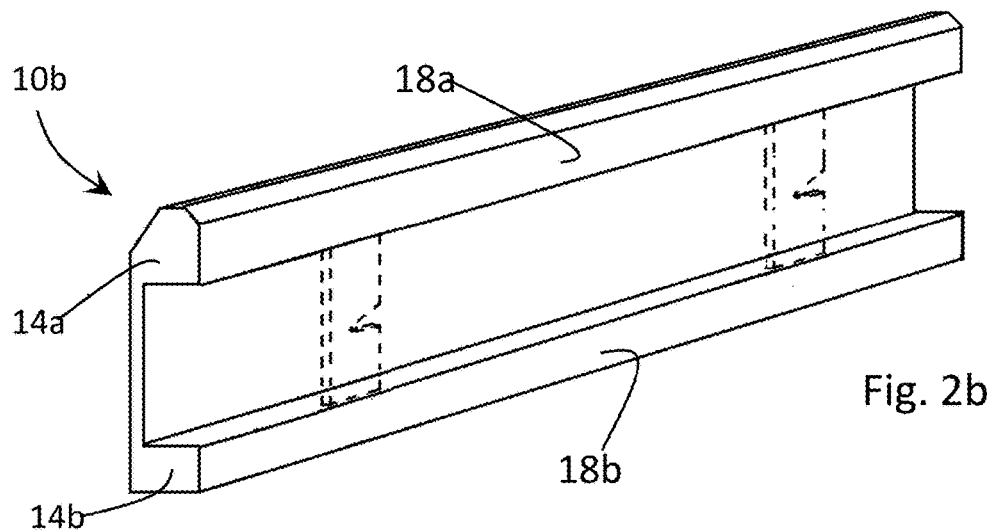
FIGS. 2b and 2c are perspective views of automotive exterior components in accordance with embodiments hereof showing alternate locations for a tape pad.
Figure 2C:
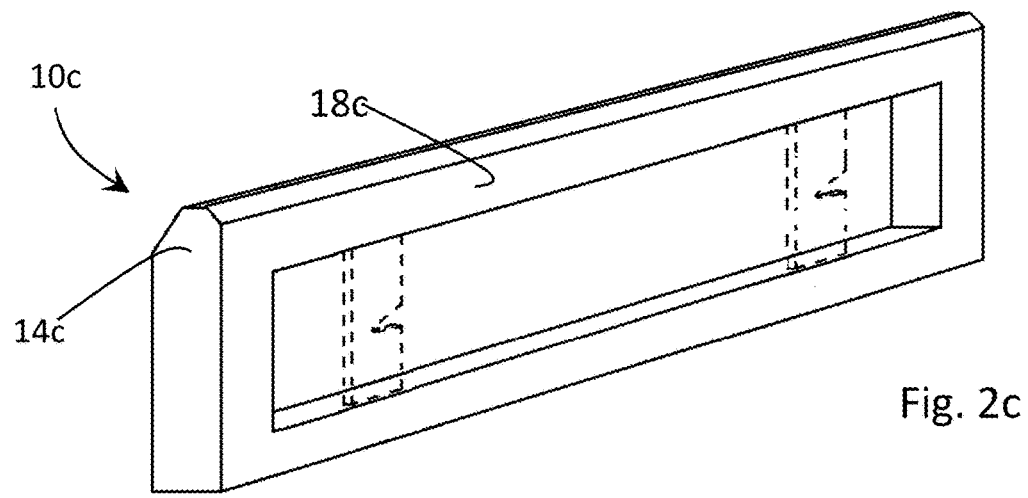

Pad support wall 14 of exterior component 10 is situated along the upper perimeter or edge of the component. As will be appreciated, pad support wall 14 may be situated at alternate locations on an exterior component, as deemed necessary for the design of the intended component and mounting environment. For example, on an exterior structure 10b shown in FIG. 2b, pad support walls 14a, 14b are located along the top and bottom perimeters or edges, respectively. In this way, tape pads 18a, 18b, and corresponding adhesive attachment, is achieved along both the top and bottom of exterior component 10b. In a still further alternate embodiment, a pad support wall 14c is situated along an entire perimeter of an exterior component 10c, as shown in FIG. 2c. In this configuration, tape pad 18c is continuous, thus permitting adhesive attachment around the entire perimeter of exterior component 10c. The location of the pad support walls and corresponding tape pads associated therewith in the embodiments shown above and below are by way of example and not limitation. Still further arrangements for the described tape pad on exterior components for automotive applications are possible, and are intended to fall within the scope of the invention as described herein.

Figure 3:
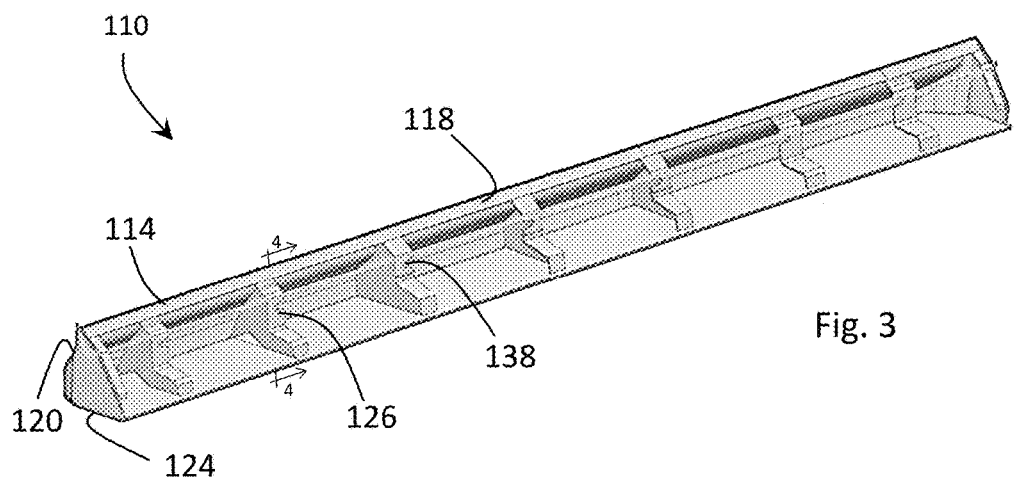
FIG. 3 is a perspective view of a door cladding in accordance with an embodiment hereof.
Figure 4:
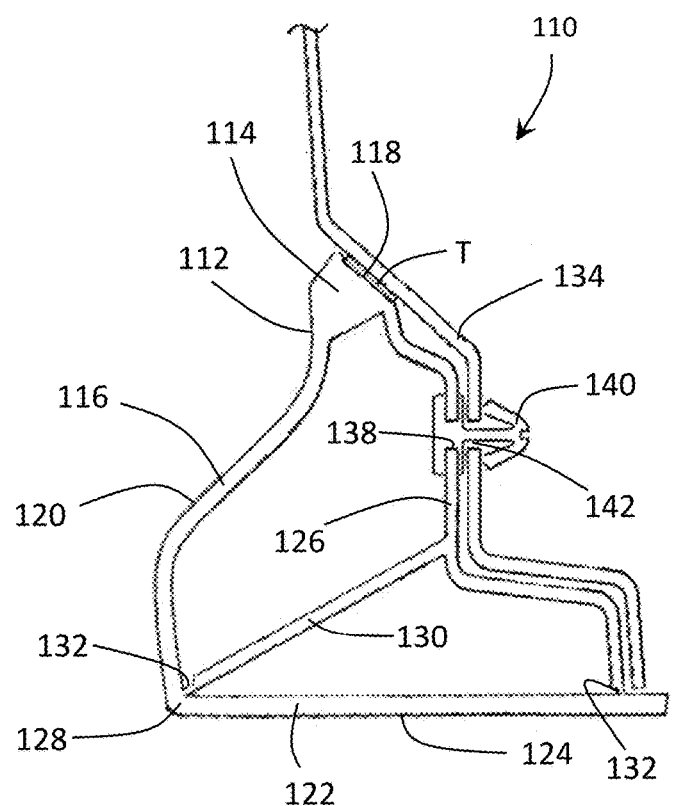
FIG. 4 is a sectional view of the door cladding of FIG. 3 taken along line 4-4.

Turning now to FIGS. 3 and 4, shown is an exemplary embodiment of an exterior component for attachment to a vehicle surface of a vehicle external structure presented in the form of a one-piece door cladding 110. Door cladding 110 incorporating a tape pad according to an embodiment of the invention. As is generally the arrangement for door claddings, this exterior component is applied to the exterior door skin, and must be securely affixed thereto to prevent detachment during vehicle use. It will be appreciated that door claddings may take on a variety of shapes, cross-sectional profiles and configurations. As shown in the sectional view of FIG. 4, which includes a door skin 134 and an automotive clip 140 added for context, door cladding 110 provides a primary body 112 having a pad support wall 114 and a profile wall 116 extending therefrom. Pad support wall 114 is generally provided as a thick-walled structure that runs substantially an entire length of door cladding 110. Pad support wall 114 presents a continuous tape pad 118, configured to receive a suitable adhesive (i.e. adhesive tape T) for bonding door cladding 110 to the vehicle surface of the vehicle structure, e.g., a door skin. Profile wall 116 defines an exterior profile of door cladding 110, and presents an exterior surface 120 having the desired aesthetic finish, for example a Class A surface as defined in the automotive arts. In the embodiment shown, primary body 112 of door cladding 110 includes a lower wall 122 having an exterior surface 124 that faces in a generally downward orientation.

Door cladding 110 may present one or more clip mounts 126 along its length on the side of door cladding 110 configured for attachment to the door. Each clip mount 126 provides a wall structure that extends from pad support wall 114 to lower wall 122 distal to lower exterior corner 128 as shown. Each clip mount 126 also presents a brace 130 extending from lower exterior corner 128 to an intermediate position along clip mount 126. Where brace 130 and clip mount 126 connect with lower exterior corner 128 and lower wall 122, respectively, neck-down regions 132 are provided to reduce the likelihood of sink mark artifacts arising during manufacture.

At an intermediate region of clip mount 126, in particular where a generally planar region has been provided at the interface between clip mount 126 and door skin 134, at least one slot or suitable opening 138 is provided for use with automotive clip 140, the features and operations of which are generally known in the art. As shown, clip mount 126 is generally shaped to follow the profile of door skin 134 to which door cladding 110 is attached, with automotive clip 140 cooperating with a respective hole 142 in door skin 134 to ensure attachment therebetween.

In use, door cladding 110 incorporates both adhesive bonding, by virtue of continuous tape pad 118 and mechanical attachment by virtue of automotive clips 140. In this way, the extent of adhesive bonding between door cladding 110 and door skin 134 is considerably increased relative to prior art arrangements incorporating intermittent thin tape ribs.

Figure 5:
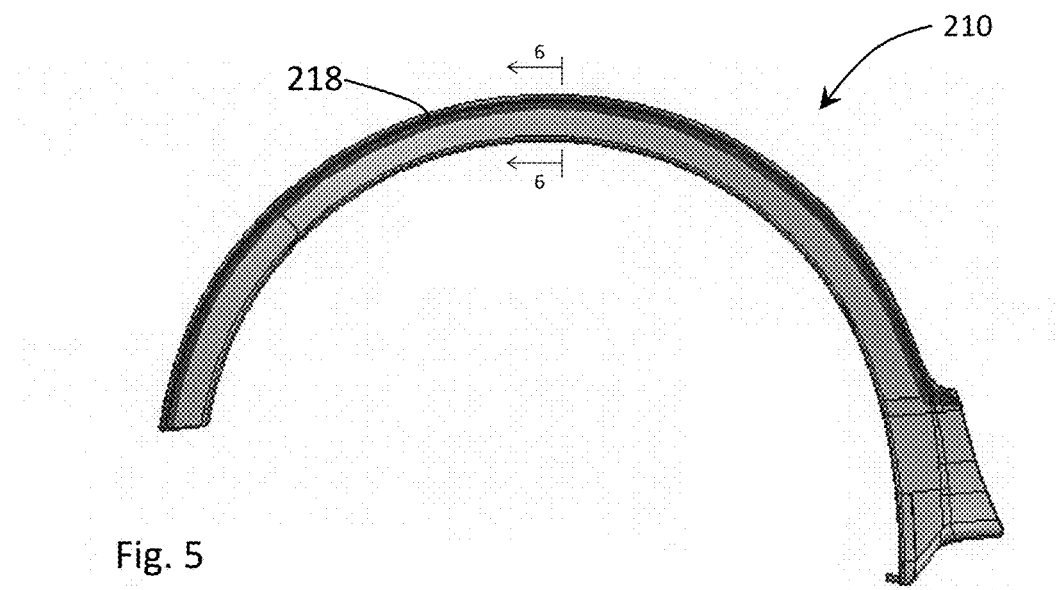
FIG. 5 is a perspective view of a wheel-flare molding in accordance with an embodiment hereof.
Figure 6:
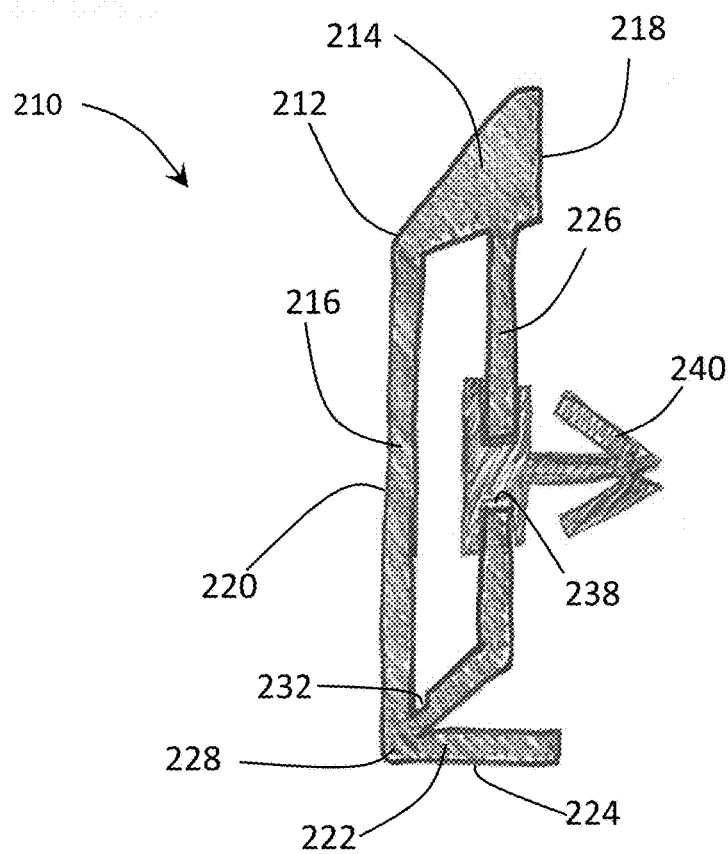
FIG. 6 is a sectional view of the wheel-flare molding of FIG. 5 taken along line 6-6.

While the aforementioned continuous tape pad has been exemplified with respect to a generally elongate structure such as automotive door cladding, it will be appreciated that it may find application in other exterior vehicle components for attachment to a vehicle surface of an external structure of a vehicle, for example an automotive wheel-flare molding 210 as shown in FIGS. 5 and 6. Having regard to the sectional view of FIG. 6, wheel-flare molding 210 provides a primary body 212 having a pad support wall 214 and a profile wall 216 extending therefrom. Pad support wall 214 is generally provided as a thick-walled structure that runs substantially an entire length of wheel-flare molding 210. Pad support wall 214 presents a continuous tape pad 218, configured to receive a suitable adhesive (i.e. adhesive tape) for bonding wheel-flare molding 210 to the surface of a fender of a vehicle. Profile wall 216 defines an exterior profile of wheel-flare molding 210, and presents an exterior surface 220 having the desired aesthetic finish, for example a Class A surface as defined in the automotive arts. In the embodiment shown, primary body 212 of wheel-flare molding 210 also includes a lower wall 222 having an exterior surface 224 that faces in a generally (radially) inward orientation.

Wheel-flare molding 210 is an arcuate structure, and presents one or more clip mounts 226 along its length to facilitate engagement with the fender portions defining the wheel openings. Each clip mount 226 provides a wall structure that extends from pad support wall 214 to lower exterior corner 228 as shown. Where clip mount 226 connects with lower exterior corner 228, a neck-down region 232 may be provided to reduce the likelihood of sink mark artifacts arising during manufacture.

At an intermediate region of clip mount 226, in particular where a generally planar region has been provided at the interface between clip mount 226 and the fender (not shown), at least one slot or suitable opening 238 is provided for use with an automotive clip 240, the features and operations of which are generally known in the art.

In use, wheel-flare molding 210 incorporates both adhesive bonding, by virtue of continuous tape pad 218 and mechanical attachment by virtue of automotive clips 240. In this way, the extent of adhesive bonding between wheel-flare molding 210 and the fender is considerably increased relative to prior art arrangements incorporating intermittent thin tape ribs.

Exterior surfaces 20, 120, 220 of the various aforementioned exterior components are generally provided as a Class A surface. As used herein, a Class A surface is intended to refer to a surface that is visually decorative and smooth to the unaided eye or, in other words is visually free of unintentional distortions, such as sink marks, dimples, indents, divots, and the like. As is generally known in the art, unintentional distortions (e.g. sink marks) can arise on the outside surface of an article opposite a projection. As such, achieving the desired Class A surface has often been the overriding factor in the placement of internal structures on molded plastic articles, as opposed to optimal positioning of such structures for increased strength and rigidity.

In the various forms presented above, pad support walls 14, 14a, 14b, 14c, 114, 214 are positioned so as to form thickened wall structures of the exterior component. As a result, a reduced likelihood of sink mark artifacts from forming on the exterior surfaces may be achieved. In addition, a range of techniques may be used to manufacture the aforementioned exterior components, in particular to achieve the desired Class A surface. One exemplary suitable technique is the injection molding process disclosed in U.S. Pat. No. 7,846,533, the content of which is herein incorporated by reference in its entirety. Although not discussed in detail herein, U.S. Pat. No. 7,846,533 teaches a process for injection molding plastic articles using a molten thermoplastic plastic, a blowing agent and a pressurizable mold cavity. In the process, gas cells form within the molten plastic and through the control of venting of the pressurizing gas during the molding process, a finished molded plastic article can be achieved having a Class A skin surface and a foamed core, regardless of the positioning of projections on the inside surface of the molded plastic article.

While any thermoplastic which is capable of being injection molded may be used for the aforementioned components, the selected thermoplastic should have the appropriate behaviour and quality to achieve the desired aesthetic and performance characteristics. Exemplary suitable thermoplastic materials include polypropylene, thermoplastic polyolefins (TPO), acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and blends of the above materials with other suitable materials (e.g. fillers including, but not limited to glass fibres, talk, etc.). Where the exterior component is subject to additional processing steps, for example chrome plating, a compatible thermoplastic may be selected, such as but not limited to ABS.

The incorporation of the aforementioned tape pad into molded exterior components promotes an increase in robustness and durability in the final product, with reduced likelihood of sink mark artifacts generally associated with intermittent support ribs. In addition, each of the components exemplified here are formed as one-piece structures, as the integration of tape pads facilitates this manufacturing methodology. By comparison, prior art systems are often comprised of multiple parts requiring post-mold assembly. As such, the molded exterior components discussed herein promote a simplification of the manufacturing process, where costs savings may be realized.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An exterior component for attachment to a vehicle surface, the exterior component comprising:
    a primary body having a pad support wall and a profile wall extending therefrom,
        the profile wall defining an exterior profile of the exterior component, and presenting an exterior surface having an aesthetic finish,
        the pad support wall being an elongate continuous structure that runs substantially an entire length of the exterior component,
        the pad support wall including a continuous tape pad configured to receive an adhesive for bonding the exterior component to the vehicle surface, and
        the pad support wall having a wall structure that is thickened relative to the profile wall; and
    at least one clip mount to provide additional mechanical attachment to the vehicle surface.

2. The exterior component of claim 1, wherein the aesthetic finish on the exterior surface of the profile wall is a Class A surface.

3. The exterior component of claim 1, wherein the at least one clip mount has a wall structure that extends from the pad support wall.

4. The exterior component of claim 1, wherein the pad support wall is located on a perimeter region of the exterior component.

5. The exterior component of claim 1, wherein the pad support wall is located around substantially an entire perimeter of the exterior component.

6. The exterior component of claim 1, wherein the adhesive is an automotive adhesive tape.

7. The exterior component of claim 1, wherein the primary body is injection molded and formed with a foamed core.

8. An automotive door cladding for attachment to a vehicle surface, the door cladding comprising:
    a primary body having a pad support wall and a profile wall extending therefrom,
        the profile wall defining an exterior profile of the door cladding, and presenting an exterior surface having an aesthetic finish,
        the pad support wall being an elongate continuous structure that runs substantially an entire length of the door cladding,
        the pad support wall including a continuous tape pad configured to receive an adhesive for bonding the door cladding to the vehicle surface, and
        the pad support wall having a wall structure that is thickened relative to the profile wall; and
    at least one clip mount to provide additional mechanical attachment to the vehicle surface,
    wherein the at least one clip mount has a wall structure that extends from the pad support wall, and wherein the at least one clip mount additionally has a brace extending therefrom to an exterior corner of the primary body.

9. The automotive door cladding of claim 8, wherein the aesthetic finish on the exterior surface of the profile wall is a Class A surface.

10. The automotive door cladding of claim 8, wherein the profile wall of the primary body transitions into a lower wall at the exterior corner of the primary body.

11. The automotive door cladding of claim 8, wherein points of contact of the brace and the at least one clip mount with the primary body have neck-down regions to reduce sink marks.

12. The automotive door cladding of claim 8, wherein the primary body is injection molded and formed with a foamed core.

13. An automotive wheel-flare molding for attachment to a vehicle surface, the wheel-flare molding comprising:
   a primary body having a pad support wall and a profile wall extending therefrom,
      the profile wall defining an exterior profile of the wheel-flare molding, and presenting an exterior surface having an aesthetic finish,
      the pad support wall being an elongate continuous structure that runs substantially an entire length of the wheel-flare molding,
      the pad support wall including a continuous tape pad configured to receive an adhesive for bonding the wheel-flare molding to the vehicle surface, and
      the pad support wall having a wall structure that is thickened relative to the profile wall; and
   at least one clip mount to provide additional mechanical attachment to the vehicle surface, wherein the at least one clip mount has a wall structure that extends from the pad support wall and a brace extending therefrom to an exterior corner of the primary body.

14. The automotive wheel-flare molding of claim 13, wherein the aesthetic finish on the exterior surface of the profile wall is a Class A surface.

15. The automotive wheel-flare molding of claim 13, wherein the profile wall of the primary body transitions into a lower wall at the exterior corner of the primary body.

16. The automotive wheel-flare molding of claim 13, wherein a point of contact of the brace of the at least one clip mount at the exterior corner provides a neck-down region to reduce sink marks.

17. The automotive wheel-flare molding of claim 13, wherein the primary body is injection molded and formed with a foamed core.

* * * * *